United States Patent [19]
Liljengren et al.

[11] Patent Number: 5,909,997
[45] Date of Patent: *Jun. 8, 1999

[54] DEVICE FOR TRANSFERRING A WORK PIECE FROM A FIRST MACHINE TO A SECOND MACHINE

[75] Inventors: John-Erik Liljengren; Josef Zitek, both of Olofström, Sweden

[73] Assignee: AB Volvo, Gothenburg, Sweden

[ * ] Notice: This patent is subject to a terminal disclaimer.

[21] Appl. No.: 08/959,645

[22] Filed: Oct. 28, 1997

Related U.S. Application Data

[63] Continuation of application No. 08/630,620, Apr. 10, 1996, abandoned, which is a continuation of application No. 08/075,507, Oct. 4, 1993, Pat. No. 5,520,502.

[30] Foreign Application Priority Data

Dec. 14, 1990 [SE] Sweden .................................. 9004006

[51] Int. Cl.$^6$ .................................................. B65G 65/00
[52] U.S. Cl. ........................................... 414/751; 414/917
[58] Field of Search ..................................... 414/733, 734, 414/736, 737, 738, 749, 751, 752, 917; 901/15, 16, 21, 29

[56] References Cited

U.S. PATENT DOCUMENTS

| | | |
|---|---|---|
| 3,834,555 | 9/1974 | Bennington et al. ................ 414/744.6 |
| 3,884,363 | 5/1975 | Ajlouny ................................ 901/16 X |
| 4,400,984 | 8/1983 | Rönbeck ................................... 74/103 |
| 4,411,587 | 10/1983 | Niki ......................................... 414/752 |
| 4,589,819 | 5/1986 | Shirao ..................................... 414/752 |
| 4,648,786 | 3/1987 | Sakuri ..................................... 414/752 |
| 4,735,539 | 4/1988 | Häkkinen ................................ 414/281 |
| 4,801,235 | 1/1989 | Rauschdorf ........................ 414/917 X |
| 4,842,476 | 6/1989 | Shiotani ................................. 414/751 |
| 5,046,916 | 9/1991 | Sörensen ................................ 414/751 |
| 5,158,423 | 10/1992 | Liljengren et al. .................... 414/751 |

FOREIGN PATENT DOCUMENTS

| 443 942 | 5/1987 | Sweden . |
| 601154 | 9/1978 | U.S.S.R. . |

*Primary Examiner*—Donald W. Underwood
*Attorney, Agent, or Firm*—Burns, Doane, Swecker & Mathis, L.L.P.

[57] ABSTRACT

A feeder for transferring workpieces from one press to another on a press line includes a carrier device with a linkage whose free, load-carrying end executes a horizontal linear movement on both sides of the carrier. The end of the linkage system is secured in an elongate boom whose longitudinal direction coincides with the linear movement. The boom is provided with a holder device appropriate to the workpieces and movable along the boom by an endless belt which, at the ends of the boom, runs over rollers and which, with the lower part, is secured in the holder device and, with the upper part, in the carrier device. The boom is provided with a sliding guide and is supported on the carrier device.

5 Claims, 4 Drawing Sheets

DEVICE FOR TRANSFERRING A WORK PIECE FROM A FIRST MACHINE TO A SECOND MACHINE

This application is a continuation of application Ser. No. 08/630,620, filed Apr. 10, 1996, now abandoned, which is a continuation of U.S. application Ser. No. 08/075,507, filed Oct. 4,1993, now U.S. Pat. No. 5,520,502.

TECHNICAL FIELD

The present invention relates to an apparatus for transferring workpieces from one machine to another, for example presses, along a path of movement which has at least one substantially linear, preferably approximately horizontal component of movement, and possibly transversely directed, preferably approximately vertical components of movement at the ends thereof, and including a carrier device which, via interconnected parts, carries a holder device for the workpiece.

BACKGROUND AND SUMMARY

Different types of feeder and conveyor equipment are previously known in the art for feeding workpieces to a press, removing the workpieces after completed pressing operation, and then conveying the workpieces for infeed into the next press.

That equipment which is employed in a press line for infeed and removal of workpieces into and out of a press, respectively, is often based on the employment of a linkage system which has a load carrying free end. The linkage system is designed in such a manner that it either realizes a path of movement which includes substantially vertical movements at both ends of a linear, horizontal displacement movement, or solely realizes the horizontal displacement movement, while the vertical movements are accomplished by raising and lowering of the linkage system proper. An example of such equipment is described in the two Swedish Patent Specifications 7311487-5 and 7910725-6, and in Swedish Patent Application No. 8803440-0.

In such cases in which the distance between two presses included in a press line is great, the above-described infeed and discharge equipment is insufficient to bridge the gap between the presses. In such situations, additional conveyor equipment is required which may be of varying designs and constructions.

The above-described conveyor equipment between the presses included in the press line may function satisfactorily in many situations, but suffers from a number of drawbacks. Thus, several different sets of gripping devices are required which, in the different working phases, grip and retain the workpiece while on its way from the one press to the other. In addition, equipment placed on the press shop floor entails problems in connection with tool change in the presses, since such equipment must wholly be dismantled and moved aside. Furthermore, desires have been expressed in the art for an increase, in relation to prior art equipment, of both work rate and transport length, so that separate conveyor equipment used between the discharger and infeeder can be omitted.

The present invention has for its object an apparatus of the type mentioned by way of introduction, the apparatus being designed in such a manner as to obviate the above-considered problems inherent in prior art equipment. Thus, the present invention is intended to provide an apparatus which takes up no floor space between adjacent presses in a press line. The present invention also relates to an apparatus which displaces an object the shortest path between two points and at high speed. The present invention further relates to an apparatus in which the requirement for a plurality of different sets of gripping and holder devices for the transported object has been eliminated. Finally, the present invention also relates to an apparatus which offers a higher degree of precision than prior art equipment.

The objects forming the basis of the present invention will be attained if the apparatus intimated by way of introduction is characterized in that the interconnected parts include an elongate boom whose longitudinal direction substantially corresponds to the direction of the linear component of movement and which is movable in its longitudinal direction in relation to the carrier device; and that the holder device is displaceable along the boom and drivable therealong by first drive means.

According to a first embodiment of the present invention, the carrier device is also suitably provided with a linkage system drivable by second drive means and provided with a free, load-carrying end which describes the linear component of movement, and the boom being secured in this end.

According to a second embodiment of the present invention, the carrier device is also suitably provided, on the one hand, with a guide for displaceable guiding and carrying of the boom and, on the other hand, third drive means for displacing the boom in its longitudinal direction in relation to the guide.

Further advantages will be attained if the apparatus according to the present invention is also given one or more of the features as set forth below.

BRIEF DESCRIPTION OF THE DRAWINGS

The invention will now be described in greater detail hereinbelow, with particular reference to the accompanying Drawings. In the accompanying Drawings.

DETAILED DESCRIPTION

While the present invention will be described below as applied in a press line with at least two presses, it is obvious that the invention may generally be reduced into practice in any other type of mechanized equipment in which a workpiece is to be moved from one position to another and deposited there. the transport distance being so great that industrial robots cannot be used.

Figure 1:
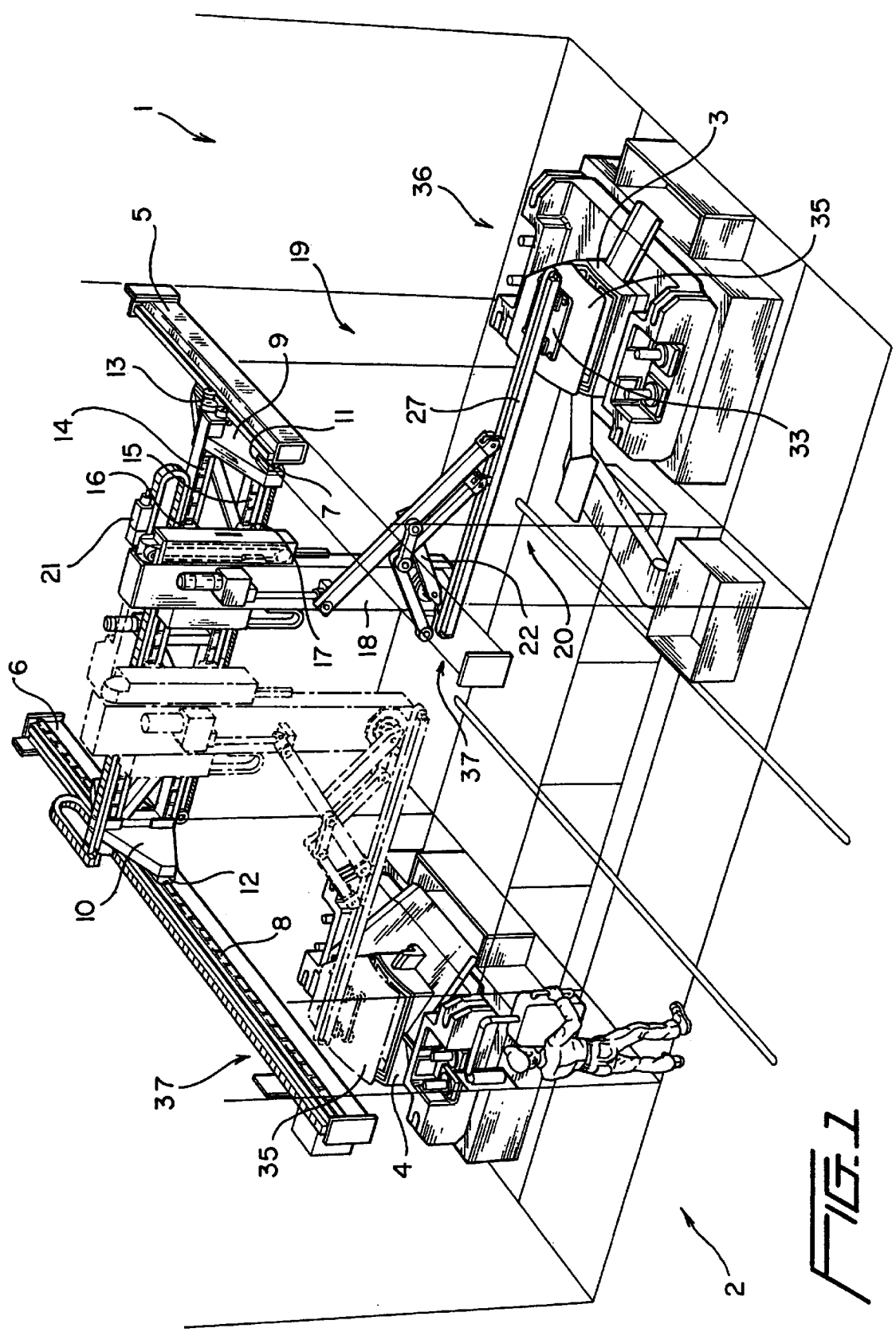
FIG. 1 is a perspective view of the subject matter of the present invention disposed on two mutually subsequent presses included in a press line.

In FIG. 1, reference numeral 1 relates to a first machine to or from which workpieces 35 are to be fed, preferably a mechanical or hydraulic press with a tool table 3, while reference numeral 2 relates to a second machine or hydraulic press, with tool table 4. Both of the machines or presses may be included, together with a further number of presses, in a press line.

On both of the sides of the presses 1 and 2 facing towards one another, there are provided elongate carrier devices 5 and 6 in the form of beams which are preferably horizontal. The beams 5 and 6 are provided with longitudinal guides 7 and 8, respectively so that carriages 9 and 10, respectively, are displaceably guided along both of the beams 5 and 6. In their opposite ends seen in the direction of travel, the carriages are provided with sliding guides 11 and 12, respectively, and, in addition, bearing trundles 13 in a central region which support the weight of the carriages on both of the beams 5 and 6.

The two carriages 9 and 10 are mutually interconnected with a steering apparatus which has two superposed beams with guide rails 14 and 15. A carriage is displaceably guided along the guide rails 14 and 15 with sliding guides 16 and 17 in cooperation with the two guide rails. The carriage (not shown on the Drawing) is further provided with a guide for mounting a carrier device 18 which supports a linkage system which, for example, may be designed in accordance with the disclosures of our prior Swedish patent application 8803440-0, but which, naturally, may also be of any other appropriate design which satisfies the conditions stipulated below.

Irrespective of how the linkage system 19 is designed in detail, according to the present invention the linkage system has a free, load-carrying end 20 which, when the linkage system is in operation, is displaced linearly, preferably in a horizontal direction.

The linkage system may be designed in such a manner that it also causes, at both ends of the linear displacement movement, a transversely directed or vertical component of movement, so that a movement cycle begins with a vertical lifting which subsequently transforms into the horizontal displacement, once again reverting to a vertical, downwardly directed movement, and vice versa.

Employing the linkage system 19 according to the present invention will make it possible to realize the vertical component of movement by a raising and lowering of the carrier device 18 in relation to the carriage under the action of a drive motor 21.

Figure 2:
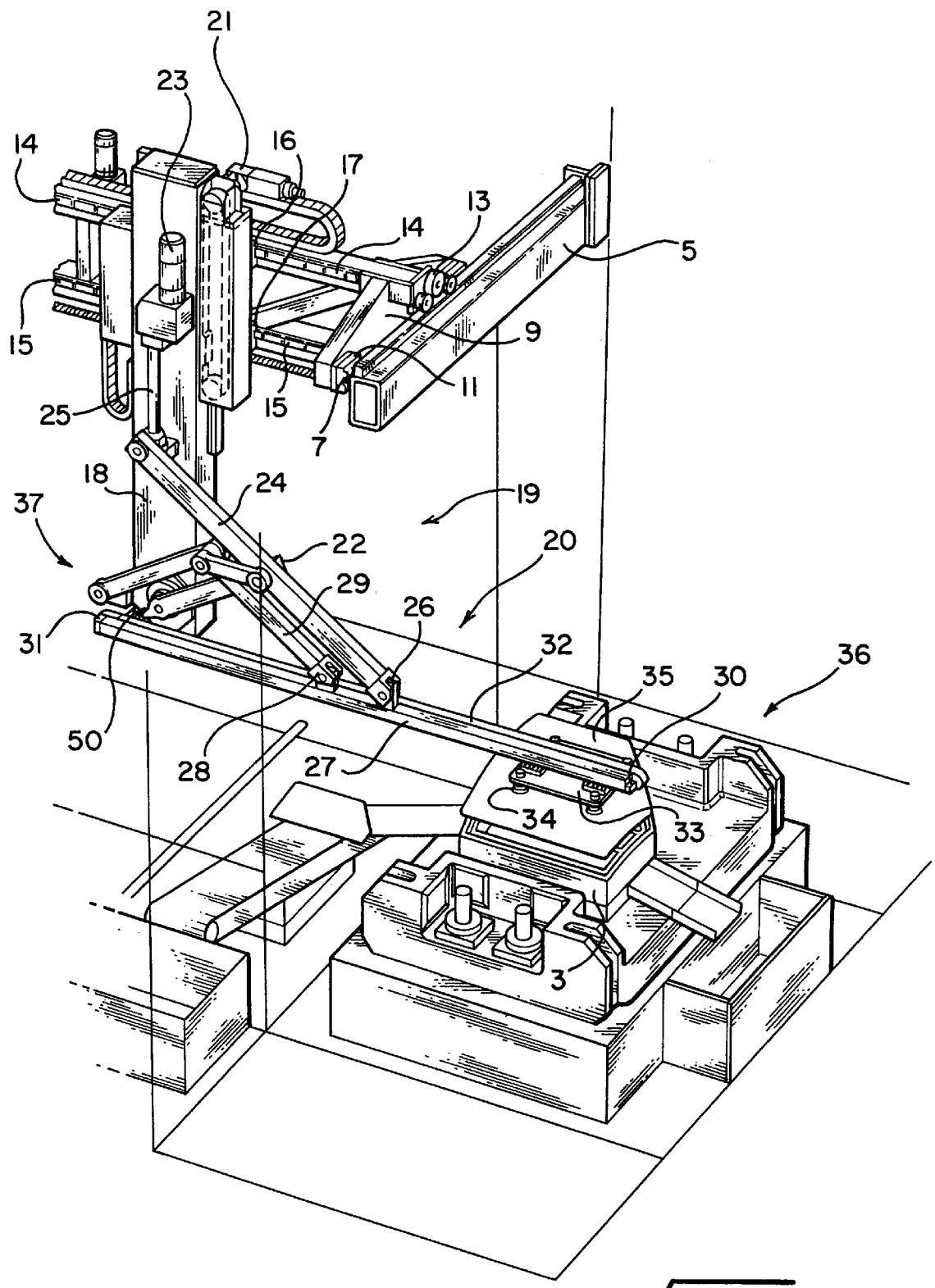
FIG. 2 from the right-hand part of FIG. 1.

As is apparent from FIG. 2, the linkage system 19 includes a drive arm 22 which is journalled in the lower end of the carrier device 18 and which, via a transmission interiorly disposed therein, is drivable by a drive motor 23 between the position shown by solid lines in FIG. 1 and the position shown by ghosted lines. The outer end of the drive arm 22 is pivotally connected to the centre point of an operating arm 24 whose upper end is slidable up and down along a guide 25. The lower end of the operating arm 24 is, via a pivot 26, connected to an elongate boom 27 whose longitudinal direction corresponds to the direction of movement of the load carrying end 20 of the linkage system 19 during its linear, preferably horizontal movement. The boom 27 is furthermore connected via a pivot 28 to a parallelogram arm 29., On its side facing towards the carrier device 18, the boom 27 has a longitudinal guide which cooperates with a guide roller 50 secured at the lower end of the carrier device 18 and laterally projecting. Since the boom 27 is guided and supported in this manner, on the one hand by the guide roller 50 at the lower end of the carrier device 18 and, on the other hand, by both of the pivots 26 and 28, the boom 27 will have three-point suspension, whereby both the precision of the movement of the boom and its load carrying capacity will be improved.

As is apparent from FIG. 2, the boom 27 is provided, at its opposing ends, with rollers 30 and 31 over which a belt 32, a chain, strap or the like is tensioned. Hereby, the belt 32 will have an upper and lower part which extend along the longitudinal direction of the boom 27. The upper part is provided with an anchorage device which is united with the lower end of the carrier device 18, whereby the upper part will remain stationary in relation to the carrier device 18 when the boom 27 is displaced in its longitudinal direction. This implies that the lower part of the belt 32 will move in the same direction as that in which the boom 27 moves, albeit at twice the speed in relation to its surroundings.

The boom is further provided with longitudinal guides for cooperation with a holder 33 so that this is displaceably guided along the length of the boom. The holder 33 is connected to the lower part of the endless belt 32, whereby the holder 33 will be displaced from one end of the boom to the other end, at the same time as the boom 27 is displaced in the same direction.

The holder 33 is provided with gripping members 34 appropriate to their purpose, the gripping members being shown on FIG. 2 as suction cups which are intended to grip and retain a workpiece 35 when this is displaced from the tool 3 of the first press 1 to the tool 4 of the second press 2.

The above-described apparatus operates as illustrated in FIG. 1 in the following manner:

The holder 33 is located at the first end 36 of the boom 27 immediately above the tool 3 of the first press 1, there having gripped the workpiece 35. In this position, the boom 27 is held stationary in that the drive arm 22 is not subjected to any pivotal movement. Instead, the carrier device 18 is raised in its guides on the carriage (not shown) mounted on the guides 14 and 15. Hereby, the workpiece 35 will be lifted vertically up from the tool 3 a suitable distance.

In this position, the boom 27 is, thus, located with its first end 36 outside the load carrying end 20 of the linkage system 19 in relation to the carrier device 18, while the other end 37 of the boom is supported on the carrier device.

During the final phase of the lifting of the workpiece 35, or only after the lifting operation has been completed, the drive arm 22 is swung in a counterclockwise direction from the position shown by solid lines to the position shown by ghosted lines. In such instance, the boom 27 will be displaced in its longitudinal direction to the left, so that the first end 36 of the boom will be located adjacent and carried by the carrier 18, while the other end 37 of the boom will be located projecting outside the load carrying end 20 of the linkage system 19 if the distance between the tools 3 and 4 is less than the maximum working length through a corresponding adapted pivotal angle for the drive arm 22. If, on the other hand, the distance between the tools is greater than the working range of the boom, the carriage mounting the carrier device 18 is also displaced along the guides until the correct working length has been reached. After completed horizontal displacement—irrespective of how this has taken place—the other end of the boom is located above the tool 4 of the press 2.

During the displacement movement of the boom, the holder 33 has further been displaced along the length of the boom from the first end 36 to the other end 37, so that the holder 33, after completed displacement, is located above the second tool 4. Thereafter, the carrier device 18 is once again lowered and the workpiece is deposited in the tool 4, whereupon the movement chart is followed in the opposite direction.

According to the invention, it is not necessary that the tools 3 and 4 in the two presses be in line with one another, but the subject matter of the present invention is also designed and constructed so as to be capable of managing a lateral displacement (transversely of the major direction of the material flow through the press line). Such a lateral displacement of the workpieces 35 is achieved in that the carriages 9 and 10 are moved along the two beams 5 and 6.

According to the invention, the drive motors (including drive motors 21 and 23) are connected to a control system so that they are capable of achieving, with a high degree of precision, the intended displacement lengths of driven components. It is thus possible to displace the carrier device 18 in the vertical direction between accurately defined end points, but also to displace the carrier device 18 along the guides 14 and 15, also here between accurately established positions. It is correspondingly possible to displace both of the carriages 9 and 10 between positions which have been clearly defined beforehand. Naturally, the angle of pivot of the drive arm 22 may also be adjusted accurately, such that the displacement length of the boom 27 may hereby also accurately be controlled.

In the above-described embodiment, use was made of a linkage system 19 for realizing the linear and substantially horizontal component of movement. Furthermore, the linkage system 19 may be designed in such a manner that it, at both ends of the linear component of movement, also causes substantially vertical components of movement.

Figure 3:
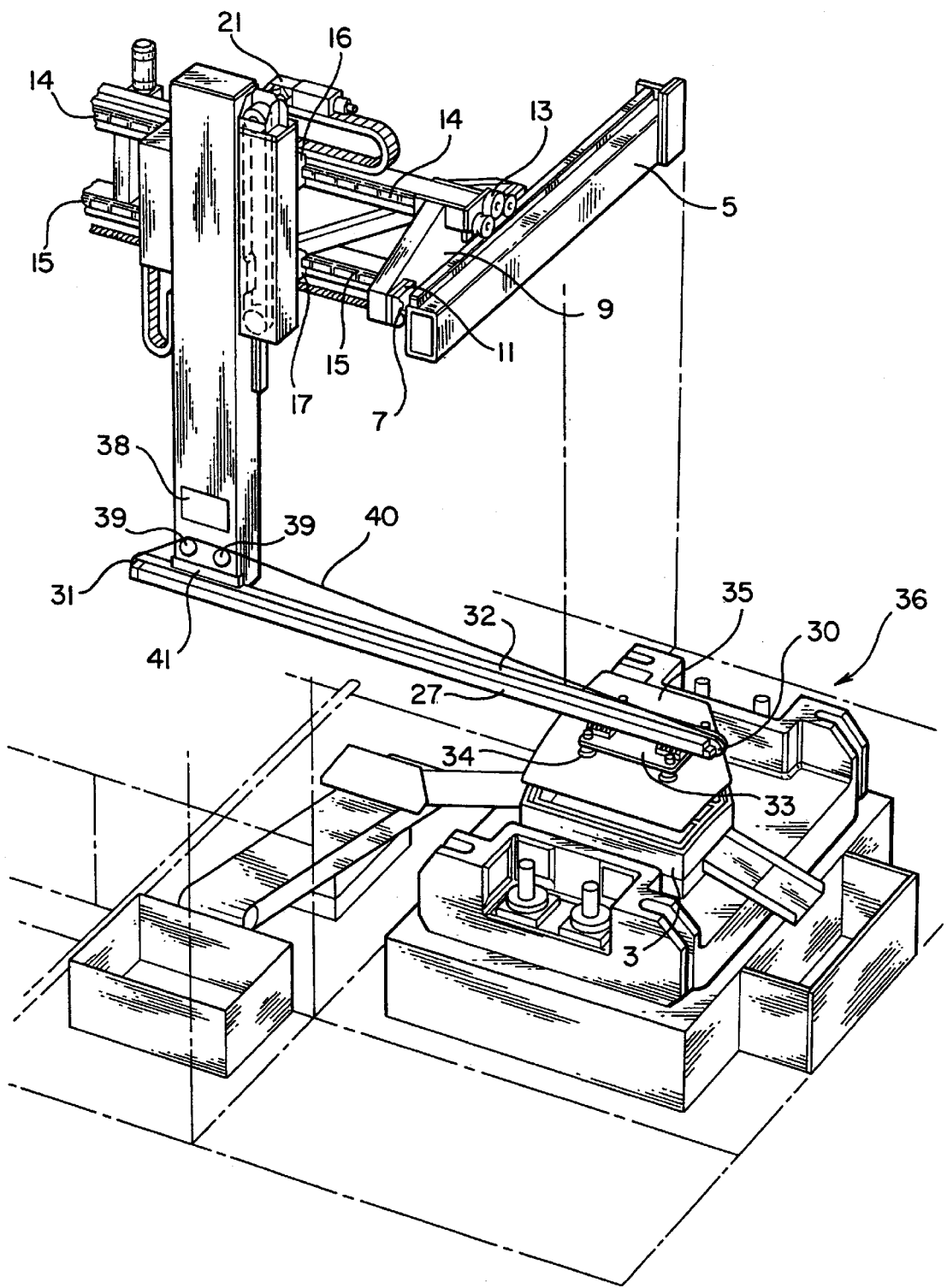
FIG. 3 is a perspective view of a system of FIG. 2 showing an alternative boom drive means.

However, the present invention also includes other versions in which the linear component of movement of the boom 27 is achieved by other means. According to FIG. 3, the carrier device 18 may be provided with a guide 41 which displaceably carries the boom so that this may, in its longitudinal direction, be displaced in the guide 41. In such instance, the guide 41 is oriented so that the longitudinal direction of the boom is substantially horizontal and parallel with the linear component of movement. In addition, the boom 27 and the guide are designed in such a manner that the boom may be displaced along substantially its entire length from one end position where, in the one direction, it projects out from the guide, via different intermediate positions to a second end position where it substantially completely projects out beyond the guide 41 the other direction.

In order to realize the movement of the boom 27 in relation to the guide, use may be made of a second belt 40, a chain, a strap or the like which, with its opposing ends, is connected to the boom 27 at the opposite ends thereof. Between its ends, the belt 40 engages with a third drive unit 38 disposed on the guide or carrier device 18, this unit engaging, by the intermediary of suitable drive rollers 39, with the belt for driving the belt and thereby also displacing the boom 27 in the guide so that the boom is shifted with its longitudinal direction substantially parallel to the linear component of movement of the workpiece.

In the same manner as in the above-described embodiments, the boom 27 is further provided, in each end, with a roller 30, 31 over which a belt 32 extends. This belt 32 is, on the one hand, connected to the guide or carrier device 18 and, on the other hand, to the holder 33 which is employed to grip and retain the workpiece 35. The arrangement with the belt connected to the holder is such that the holder moves in the same direction as the boom, but at twice the speed of the boom.

Analogous with that described above, use may be made, instead of the belt for driving the holder, of other suitable drive means such as hydraulic or pneumatic cylinders, electric linear motors, ball bearing screws, and so on.

In order to realize vertical components of movement in the embodiment now under discussion, the guide carrying the boom may be raisable and lowerable along the carrier device 18 and drivable in a vertical direction by suitable drive means, possibly including a belt, suitable guide rollers and at least one drive roller connected to a drive motor. Other types of drive means may of course also be applicable in this context, including gear racks, ball bearing screws, cylinder assemblies and the like.

Another alternative for realizing the vertical movement also resides in the possibility of rendering the entire carrier device 18 raisable and lowerable and operable in this direction under the action of suitable drive means.

Figure 4:
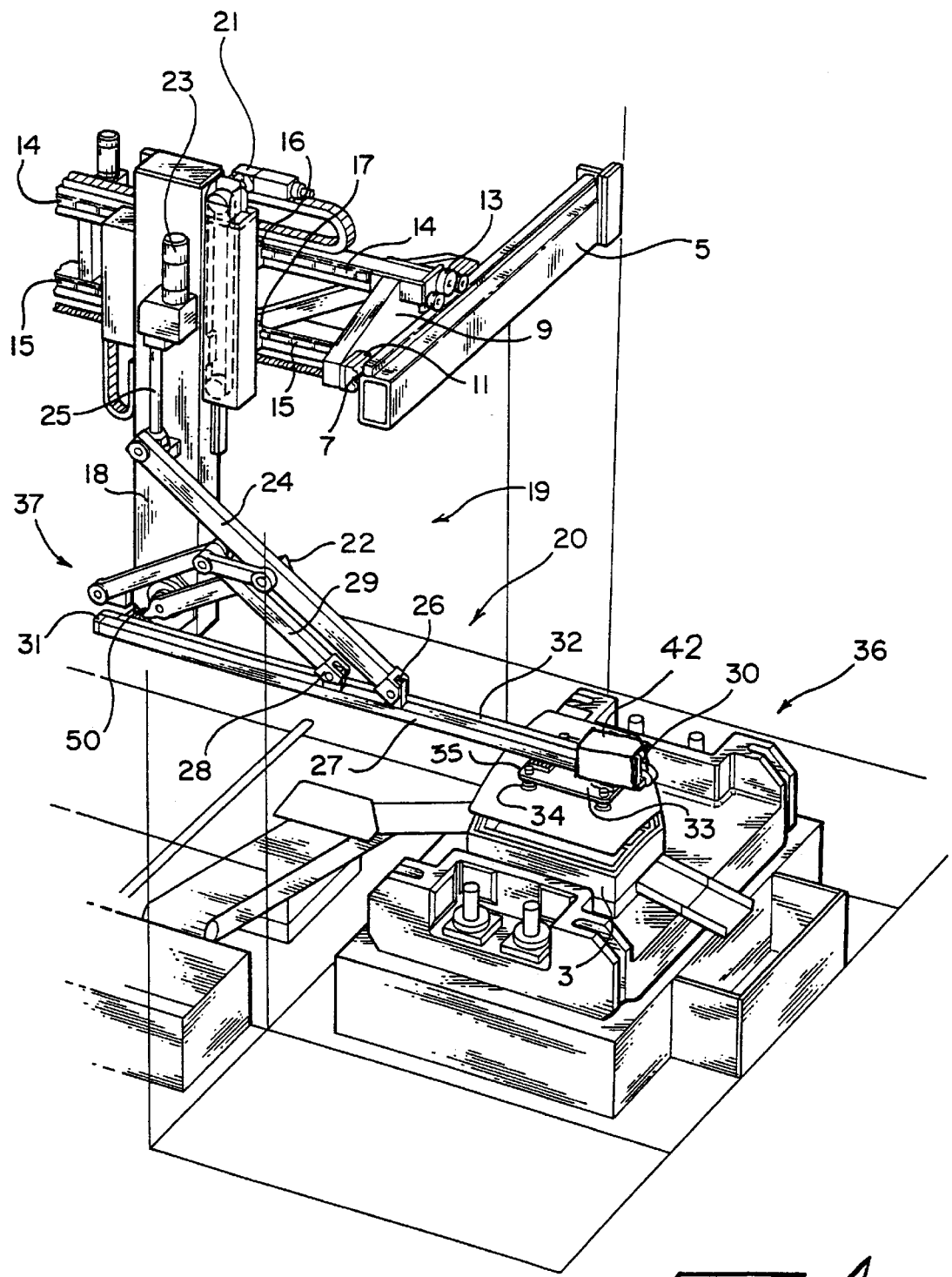
FIG. 4 is a view of the section of FIG. 2 showing an alternative drive means for displacing the workpiece holder.

While the above-described drive means for the holder 33 in the form of the endless belt 32 enjoys major advantages, it is possible, as alternatives in all embodiments, to employ for instance ball bearing screws, hydraulic or pneumatic cylinder assemblies with or without rams, and so on. Furthermore, the connection of the belt 32 with the carrier 18 may, of course, be dispensed with and the belt instead be given a separate drive unit 42 which is carried by the boom 27, as shown in FIG. 4.

According to the present invention, a transversely-directed movement of the workpiece 35 may also be realized by providing, on the holder 33, a transversely-directed (preferably at right angles to the longitudinal direction of the boom 27) sliding guide whose moving portion carries gripping members corresponding to the suction cups 34. The employment of such a transversely directed guide may replace the shifting of the carriages 9 and 10 along both of the beams 5 and 6.

It is further possible to place, between the holder 33 and a part carrying suitable gripping members 34, an adjustment device which permits rotation or tilting of this part about one or more axes in relation to the holder. Thus, a pivot device with vertical pivotal axis may be employed in a situation when the presses are not in alignment with one another. In such a situation, no displacement of the carriage 9 need take place if, instead, the boom 27 is directed with its longitudinal direction and direction of movement along the "oblique" direction of transport of the workpiece, and this is pivoted about the vertical axis during its transport.

According to the invention, it is further possible to employ two holders 33 on each boom 27 and to place, on these holders, equipment for transferring the workpiece from the one holder to the other, possibly at the same time as the workpiece is tilted or turned.

One further alternative to the lateral displacement which is realized by shifting of the carriages 9 and 10 along the beams 5 and 6 may be achieved in that the guide arrangement 14, 15 is obliquely directed in relation to the major direction of the material flow along the press line. Such an oblique disposition of the guide arrangement could be achieved, for example, in that only one of the carriages 9 and 10 is laterally displaced, while the other is retained in position. The guide arrangement is in such a version, pivotally connected to the carriages 9 and 10, the pivot axes being vertical. Furthermore, the connection between the carriages and the guide arrangement or arrangements is per se designed such that a longitudinal alteration in the longitudinal direction of the guide arrangement can be realized.

According to the present invention, it is not necessary to employ the beams 5 and 6 carried by the presses 1 and 2, but these beams may instead be placed on a separate frame carried on the substrate or be disposed on a carriage drivable over the substrate. Furthermore, the beams 5 and 6, as well as the carriages 9 and 10, may be wholly dispensed with if, instead, the guide arrangement 14 and 15 is mounted on a carriage drivable over the substrate.

The present invention may be further modified without departing from the spirit and scope of the appended claims.

We claim:

1. An apparatus for transferring a work piece along a work path from a first to a second station, the work path having at least a substantially horizontal longitudinal direction, comprising:

a carrier device;

a linkage system mounted on the carrier device and having a free end for load carrying;

means for driving the linkage system so that the free end is movable relative to the carrier device along the longitudinal work path;

an elongated boom fixed to the free end of the linkage system for movement with the free end of the linkage system, the elongated boom having a longitudinal direction parallel to the longitudinal work path;

a work piece holder device mounted on the boom for movement substantially from one end of the boom to an opposite end of the boom along the longitudinal direction of the boom; and drive means connected between the carrier device and the boom for moving the holder device along the boom.

2. The apparatus as claimed in claim 1, wherein the boom is fixed to the linkage system at a central region of the boom; and further comprising means for slidably guiding and supporting the boom on the carrier device, the boom having a first position with a first end of the boom extended from the carrier device and an opposite second end of the boom supported by the carrier device, and a second position with the second end of the boom extended from the carrier device and the first end supported by the carrier device.

3. The apparatus as claimed in claim 1, further comprising means for moving the carrier device in a vertical direction for selective raising and lowering movements of the boom.

4. An apparatus for transferring a work piece along a work path from a first to a second station, the work path having at least a substantially longitudinal horizontal direction, comprising:

a carrier device;

an elongated boom movably carried on the carrier device with a longitudinal direction of the boom parallel to the longitudinal work path;

means for displacing the elongated boom comprising a linkage system mounted to the carrier device and longitudinally moveable relative to the carrier device, wherein the boom is fixed to the free end of the linkage system;

means for driving the linkage system;

a work piece holder mounted on the boom for movement along the longitudinal direction of the boom substantially from a first end of the boom to an opposite second end of the boom; and work piece holder drive means for moving the work piece holder along the boom, the work piece holder drive means comprising rollers rotatably mounted at opposite longitudinal ends of the boom, and a transmission belt fixed to the carrier device and extending along the longitudinal length of the boom over an upper side of the boom and around the rollers and along a lower side of the boom, wherein the work piece holder being attached to the transmission belt on the lower side of the boom, so that movement of the boom causes the work piece holder to move relative to the boom in the direction of travel of the boom;

wherein, the work piece holder has at least a first position at the first end of the boom extended toward the first station, and a second position at the second end of the boom extended toward the second station.

5. An apparatus for transferring a work piece along a work path from a first to a second station, the work path having a substantially longitudinal horizontal portion and a substantially vertical portion, the apparatus comprising:

a carrier device;

a linkage system mounted on the carrier device and having link arms pivotably mounted to the carrier device, the linkage system having a movable free end for load carrying;

an elongated boom fixed to the free end of the linkage system for movement with the free end of the linkage system, the elongated boom having a longitudinal direction parallel to the longitudinal horizontal work path;

means for slidably guiding and supporting the boom on the carrier device, the boom having a first position with a first end of the boom extended from the carrier device and an opposite second end of the boom supported by the carrier device, and a second position with the second end of the boom extended from the carrier device and the first end supported by the carrier device;

means for driving the linkage system to move the free end in the longitudinal horizontal portion of the work path for selective longitudinal movement of the boom;

means for moving the carrier device in the vertical portion of the work path for selective vertical movement of the linkage system and the boom;

a work piece holder device mounted on the boom for movement substantially from one end of the boom to an opposite end of the boom along the longitudinal direction of the boom; and drive means for moving the holder device along the boom.

* * * * *